United States Patent [19]

Burch et al.

[11] E Re. 28,578

[45] Reissued Oct. 21, 1975

[54] SNAP-ACTING MECHANISMS

[75] Inventors: Lyndon W. Burch, Boston, Mass.; Hadley K. Burch, Pittsfield, Vt.

[73] Assignee: B/K Patent Development, Inc., Highland Park, Ill.

[22] Filed: Sept. 28, 1973

[21] Appl. No.: 401,708

Related U.S. Patent Documents

Reissue of:

[64] Patent No.: 3,213,228
Issued: Oct. 19, 1965
Appl. No.: 311,194
Filed: Sept. 24, 1963

U.S. Applications:

[63] Continuation-in-part of Ser. No. 140,542, Sept. 25, 1961, abandoned.

[52] U.S. Cl. ..... 200/67 DA; 200/67

[51] Int. Cl. ..... H01h 13/36

[58] Field of Search..... 200/67 R, 67 DA, 67 DB; 74/100 P

[56] References Cited

UNITED STATES PATENTS

| | | | |
|---|---|---|---|
| 2,179,099 | 11/1939 | Nelson | 200/67 DA |
| 2,288,517 | 6/1942 | Dubilier | 200/67 DA |
| 2,425,717 | 8/1947 | Bean | 200/67 DA |
| 2,624,819 | 1/1953 | Spina et al. | 200/67 DA |
| 2,777,032 | 1/1957 | Burch | 200/67 DA |

*Primary Examiner*—David Smith, Jr.
*Attorney, Agent, or Firm*—Kenway & Jenney

22 Claims, 27 Drawing Figures

SNAP-ACTING MECHANISMS

Matter enclosed in heavy brackets [ ] appears in the original patent but forms no part of this reissue specification; matter printed in italics indicates the additions made by reissue.

---

This invention relates to snap switches and is a continuation-in-part of our application Ser. No. 140,542, filed Sept. 25, 1961, now abandoned.

The invention concerns the type of switch which employs a planar loop of resilient sheet metal, which is stressed to an unstable condition. Such a stressed loop can be caused to curve to one side of the plane and can be actuated to snap to the opposite side, to make or break a circuit. The actuating devices for such switches can move in response to heat, pressure, humidity, speed, acceleration, magnetism, and coins for instance.

The present invention enables such switches to respond better to their actuating devices, and the invention, as well, gives a marked improvement in the durability, expense of manufacture and current carrying capacity of such switches.

According to the invention a snap element is formed by securing one end of each of two distinct, preferably coplanar loops of resilient sheet material together, preferably the outer arms being linked by a connector member in the form of a resilient bar. Further, according to the invention, the element is mounted, stressed and actuated in a number of different modes to achieve a variety of desired effects. By these various modes the element can be caused to require little force or little movement differential to achieve sensitive actuation; it can be caused to produce high contact pressures so that it can control very high electrical currents; and it can make use of the contact actuated, wipe and shear principle so that it can be immune to the effects of overtravel and contact welding.

In this specification the term "movement differential" refers to that distance an actuator must move between actuating position, where it causes the element to snap away from the normal state, and release position, where it allows the contact to snap back. "Force differential" refers to that percentage of force required for actuation that can remain exerted upon the actuator when the element snaps back to its normal condition. "Contact pressure" refers to the force transmitted between the contact carried by the element and the cooperating contact. "Overtravel" refers to the motion of the actuator that continues after the element has been snapped from normal condition. And "contact welding" refers to the undesirable electric arc welding effect that occurs between separable electric contacts.

According to the invention, both spring loops are formed of resilient strips of metal having a high length to width ratio and both are stressed in an edgewise direction in the initial plane of the strips, thereby causing the two loops to be unstable so they can snap from one side to the other when force is applied. With the ends of the outer arms of the loops secured, a stressing force can be applied in the plane of the strips by a single stressing member mounted between the inner arms; or the inner arms can be held at their unstressed position and the outer arms can be pulled inwardly by the connector member, e.g., by an integral bar that is shortened by being indented to stress the element. Similarly, a central spacer member between the inner arms or a connector member between the outer arms can mount the element to carry the movable contact.

Preferably, the loops are generally U shaped and disposed in a parallel relation and the outer arms are joined by an integral connecting bar that will lie in the plane of the inner and outer arms when the element is unstresssed. When the element is stressed and the upper surface becomes concave, the connector bar will move to its up position and vice versa.

For one mode of actuation, the inner arms of the loops mount the element and the contact is carried by the connector member at its juncture with one of the spring loops which we will call the first loop. A stopping means is provided to keep the element in one of the over-center positions in the absence of an actuating force, preferably this function being performed by the position of the stationary contacts.

The actuating force is progressively applied to the second spring loop which pre-travels this loop toward an unstable position. Initially such travel has little effect upon the first spring loop or the contact because of the resilience of the second loop. But when the actuator moves enough, the second spring loop overcenters and snaps, moving the connector member abruptly, and driving the second loop at least partially over-center, snapping the movable contact to its second condition. On release of the actuating force, the spring loops snap back to the normal condition.

When the switch element is thus centrally mounted by its inner arms, and when the point of actuation and the movable electrical contact are positioned at diametrically opposite sides of this central mount, the downward actuating force sets up a movement on the element about a horizontal axis that passes through the central mount. This movement helps preserve the contact pressure and cause wiping of the contacts during pre-travel as is desired.

Instead of applying an actuating force on one loop, a bridge actuating member, in conjunction with stop members on the opposite face of the loops, can apply actuating forces to both loops simultaneously. This can produce very high pressure between the contacts, while requiring relatively low movement and force differentials. For this purpose the loops preferably are placed under substantial stress, so the ratio of total actuating force to contact pressure is made higher than that obtained by force applied to only one of the loops.

When employing such bridge actuating members, a single contact can be carried at the middle or two contacts can be carried, one at each side of the connector member, while the element is mounted by its inner arms. Alternatively the element can be mounted by the connector member and the contact can be carried by the inner arms of the loops. In any of these cases the bridge actuator construction enables the switch element to be completely symmetrical and hence very easy to mount and actuate.

By reversing the location of the bridge actuator and stop members, the actuating force can act in the opposite direction relative to the snapping motion of the contact, so the switch element can be made immune to the effects of high acceleration forces such as occur with vibratory movements.

In employing the wipe and shear principle the snap element can be mounted to move edgewise between two opposed camming surfaces, and the contact, whether on the connector member or at the inner arms, can wipe against one of the camming surfaces until the form of the cam applies enough force to snap the element, whereupon the contact jumps to the other camming surface. By proper design of the camming surfaces the contacts can be caused to wipe throughout both over-travel and undertravel, and unlike the other types of mounting, such travel need not cause progressive deformation of the element.

The invention is illustrated in the drawings wherein.

Figure 13:
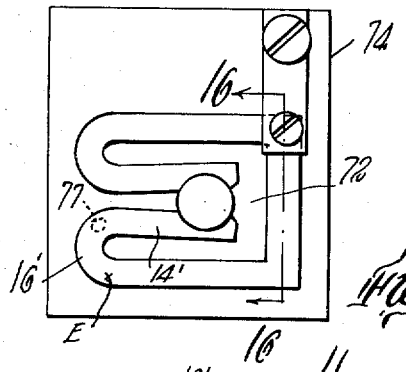
Figure 14:
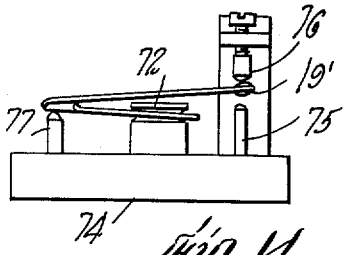
Figure 15:
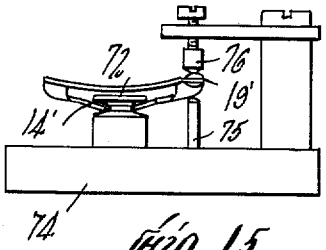
Figure 10:
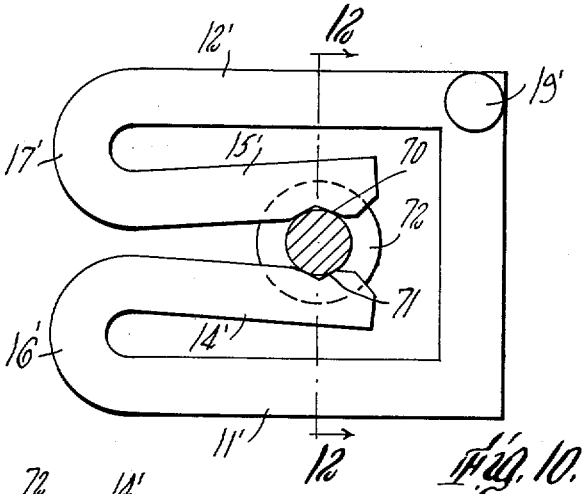
FIG. 10 is a plan view of another element combined with a stressing means which forces the inner arms away from each other.
Figure 16:
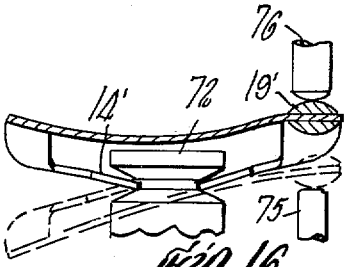
Figure 17:
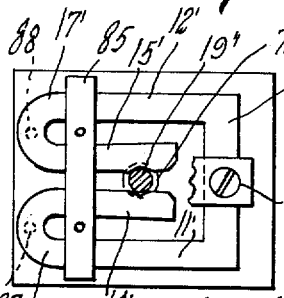
Figure 18:
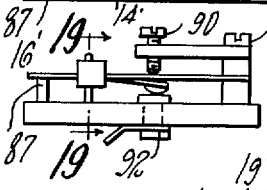
Figure 19:
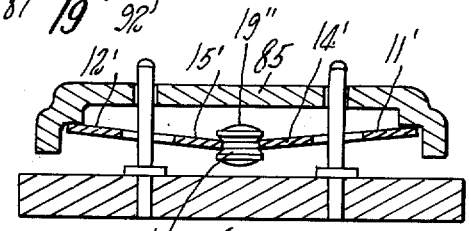
Figure 20:
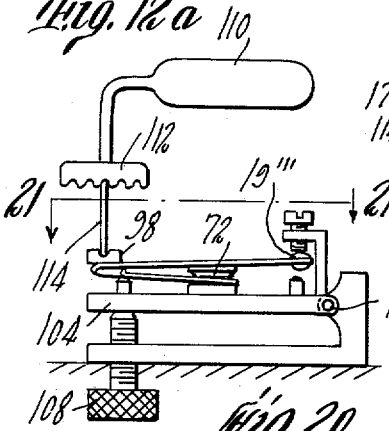
Figure 21:
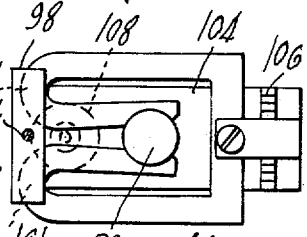
Figure 22:
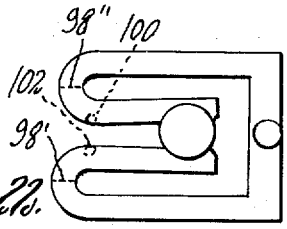
Figure 23:
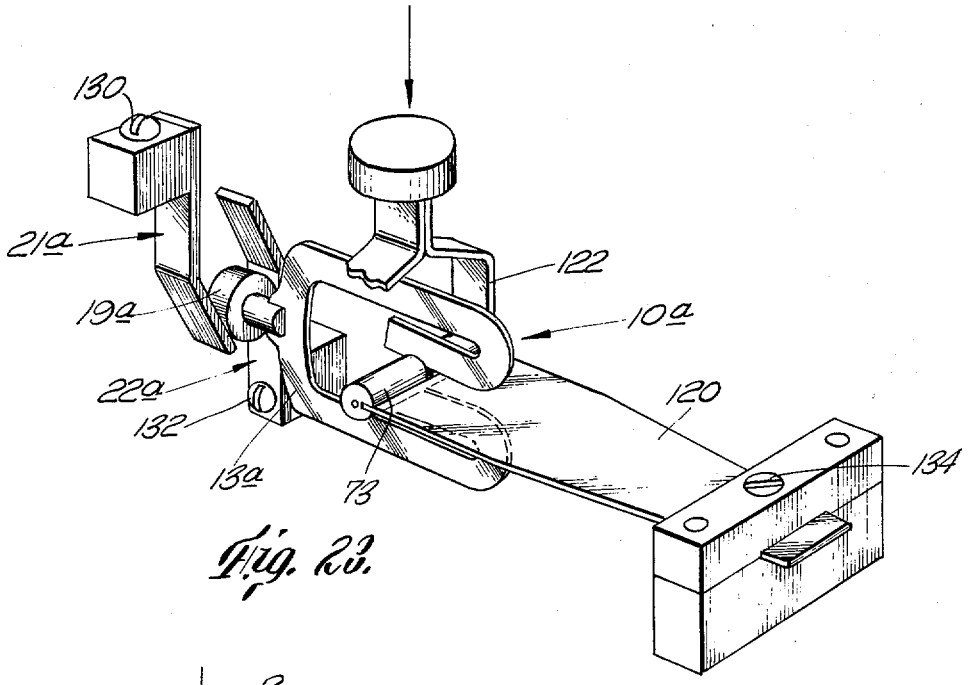
Figure 24:
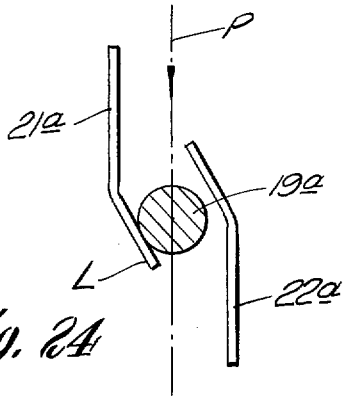

FIGS. 13, 14, and 15 are plan, side and end views, respectively; of a switch incorporating the element of FIG. 10;

FIG. 16 is a cross-sectional view of the switch of FIG. 13, taken on line 16—16 thereof;

FIGS. 17 and 18 are plan and side views, respectively, of a switch in which the inner arms carry the movable electrical contact;

FIG. 19 is a cross-sectional view of the switch of FIG. 18 taken on line 19—19 thereof;

FIGS. 20 and 21 are side and plan views, respectively, of another switch incorporating the element of FIG. 10 in which the inner arms are mounted to the supports, and the switch comprises the adjustable member of a thermostat;

FIG. 22 is a plan view of the switch element of FIG. 20, showing the location of the actuating forces;

FIG. 23 is a perspective view of an embodiment of the invention that allows the advantages of the wipe and shear concept to be obtained in a simple and inexpensive way;

FIG. 24 is an end view of the switch of FIG. 23 in the normal position; and

Figure 25:
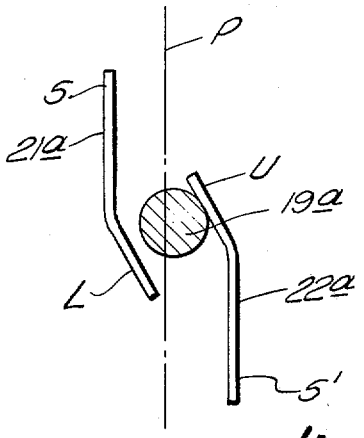

FIG. 25 is an end view of the switch of FIG. 23 in the actuated position, showing how the camming surface is shaped to prevent deflection of the element during over-travel.

Figure 1:
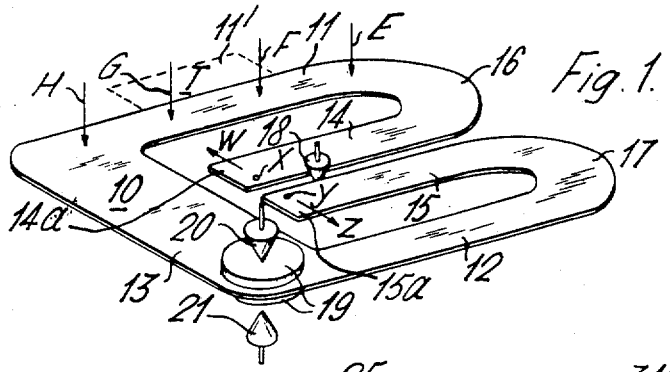
FIG. 1 is a perspective view of an embodiment of the snap-acting element.

Referring to the embodiment of FIG. 1, the preferred snap element is an M-shaped blade 10 which is a sheet-like flat member constructed of resilient material such as Phosphor bronze or beryllium copper. It includes a pair of spaced-apart, parallel, coextensive outer arms 11, 12 that have one pair of adjacent ends connected together by an integral connector bar 13 which extends therebetween. Parallel, coextensive inner arms 14, 15, shorter than the outer arms, are disposed within the space defined by the outer arms 11, 12. These are joined to the other ends of the outer arms 11, 12 by arcuate integral connections 16, 17. The ends 14a, 15a of the inner arms terminate adjacent to, but spaced from, the connector bar 13. The member 10 thus defined comprises two sheet metal loops, 11, 16, 14 and 12, 17, 15 disposed adjacent to one another, in the form of an M, the outer arms of the loops being joined by connector bar 13, and the inner arms having free ends.

The inner arms 14, 15 may be mounted at points X and Y close to their inner longitudinal edges and at or close to their free ends 14a, 15a. Such mounting should provide a minimum of contact area on the faces of the arms and prevent movement of the points X and Y out of the general plane of the blade 10. The inner arms 14, 15 are stressed away from each other, and towards their outer arms in the direction of arrows W and Z by a stressing means such as a tapered pin 18. After pin 18 is moved downward into place spreading the inner arms apart, it is secured. The resultant stress causes the loops to be unstable if held flat, so they tend to assume a curved condition with one side of the loops and connector bar concave and the other side convex.

An electrical contact 19 is secured to blade 10 at the junction of outer arm 12 and connector 13, and upper and lower, spaced-apart stationary electrical contacts 20 and 21 are mounted for engagement by the contact 19. If, for example, it is desired to define a normally upward position for contact 19, during assembly the blade is first caused to have its upper surface convex, the lower contact 21 is moved upward until the member snaps so that the upper surface becomes concave and bar 13 moves contact 19 upward to engage upper contact 20. Permanent mounting of lower contact 21 in this stopping position or higher insures that when no actuating force is applied to the blade, contact 19 always will engage upper contact 20 and the upper surface will be normally concave. To actuate this embodiment a push rod or other common actuator means applies a vertical force to either outer arm; the force may, for example, be applied to any of the points E, F or G on arm 11. Force applied at H will cause creep rather than snap action in the usual case.

At first only the loop (11, 14, 16) that receives the force changes a noticeable amount, deflecting downwardly and tending to have less curvature. At this stage the elongated and resilient character of this loop and connector bar 13, and the resistance offered by the loop 12, 15, 17 which is not receiving the force, prevent contacts 19 and 20 from breaking apart. Suddenly, with slight additional movement of the actuator, the loop over-centers and connector bar is moved substantially downwardly. Lowering of the connector bar causes loop 12, 15, 17 to over-center, despite the stopping postion of contact 21 and contact 19 snaps against contact 21. With release of the actuator in the opposite direction, as soon as a small amount of force has been released and the blade travels a small extent in the reverse direction, the blade will snap back to its original position. The differential of movement of the actuator means between the two snap postions, and the difference in the force applied by the actuating means in these two positions changes in a definite manner as the location of the actuating force moves from E to G, enabling adjustment to the precise characteristics desired.

The normal contact pressure is improved when the actuating force acts in the vicinity of point E, diametrically opposite of the contact 19 relative to the central mounting points X and Y. The downward force tends to rotate the entire blade about mounting X, Y, which has the desirable effect of wiping the movable contact 19 against whichever stationary contact it is in contact with. During pretravel the tendency to rotate about X, Y tends to move contact 19 upwardly, helping to preserve normal contact pressure, although the actuator is in the act of causing the contact 19 to break from the contact 20. Since the amount of electrical current allowable through a pair of contacts depends upon the pressure of their engagement immediately before breaking apart, higher currents can be handled by the blade because of this added force.

For purposes of an example only, the pair of loops can be identical in shape, stamped from a flat sheet of Phosphor bronze 0.018 inch thick. Arms 11, 12 14 and 15 and arcuate connectors 16 and 17 can all be ½ inch wide and the connector bar 13 can be 13/16 inch wide. The width of the blade measured transverse to the arms can be 3¼ inches and the length can be 3½ inches. The inner legs 14 and 15 can be spaced ⅛ inch apart, unstressed, and the free ends can be spaced ⅛ inch from the adjacent edge of connector 13. As another example, a blade 0.010 inch thick can be .781 inch wide and 1.031 inches long. The inner and outer legs and the arcuate connections can have a width of .109 inch and the connector strip 13 can have a width of .187 inch. The spacing between the inner arms can be .031 inch in the unstressed condition and the arcuate connectors can be semicircular, with outer edges of .375 inch diameter.

The dotted lines in FIG. 1 indicate a tab or extension 11' upon which the actuator means can apply its force, the force decreasing but the differential of travel increasing in the direction outwardly from arm 11.

Figure 2:
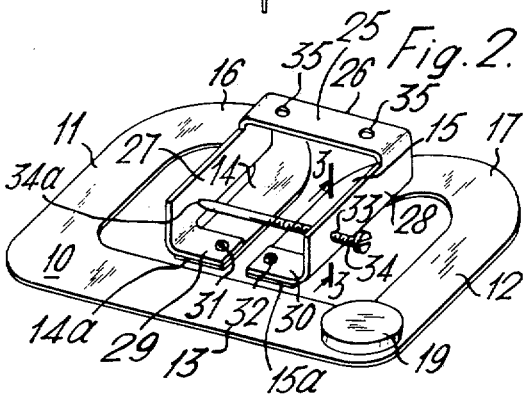
FIG. 2 is a perspective view of a means for mounting and stressing the element.
Figure 3:
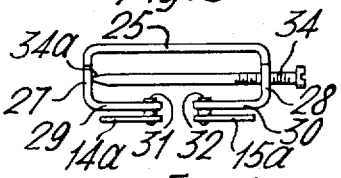
FIG. 3 is a cross-sectional view taken on line 3—3 of FIG. 2.

The blade of FIG. 1 may be supported and stressed in the manner as shown in FIG. 2 employing bracket 25. From cross bar 26 of this bracket extend a pair of legs 27, 28, supporting tabs 29, 30 which overlie free ends 14a, 15a of the inner arms. These tabs are secured at points X, Y to the blade for instance by rivets 31, 32. As seen in FIG. 3, spacing collars between each tab 29, 30 and the blade limit the area of contact.

Leg 28 has a threaded opening 33 receiving screw 34. End 34a of the screw engages leg 27 so by turning the screw, the legs 27, 28 spread apart. The cross bar of the bracket 25 has holes to mount the entire assembly.

Figure 4:
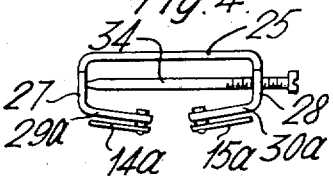
FIG. 4 is a view similar to FIG. 3 illustrating a modification thereof.

Referring to the modification of FIG. 4, the tabs 29a and 30a may be bent at an angle to cause the blade to be biased to one of its curved conditions to establish the curvature of the normal position, creating a closer force differential.

Figure 5:
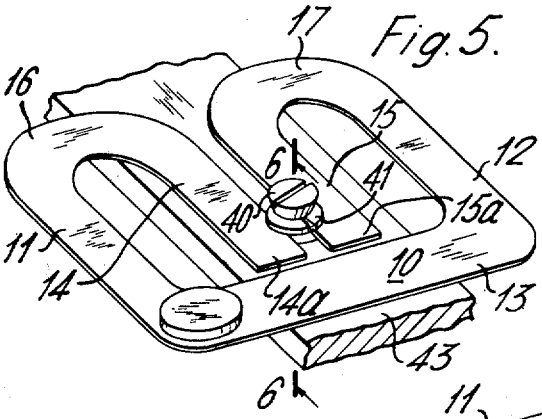
FIG. 5 is another embodiment in which a single post member serves to mount the element and stress it.
Figure 6:
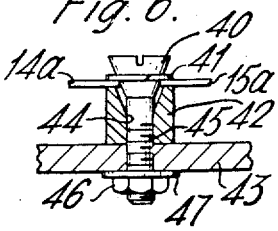
FIG. 6 is a cross-sectional view taken along line 6—6 of FIG. 5.

Referring to FIGS. 5 and 6, a single mounting post can be employed to mount and stress the arms of the blade. This includes a screw 45 having a tapered head 40 which engages the inner edges of arm portions 14a, 15a. A split washer 41 under screw head 40 engages the upper surfaces of the inner arms while a spacer collar 42 is disposed between the inner arms and base 43. The bore of the spacer collar is flared at its upper end to receive the tapered head 40. By tightening nut 46 with washer 47, the tapered head 40 is driven into wedging engagement with the inner arms to spread them as desired. This device also mounts the blade, and restrains movement of the end portions 14a, 15a from the general plane of the blade.

Figure 7:
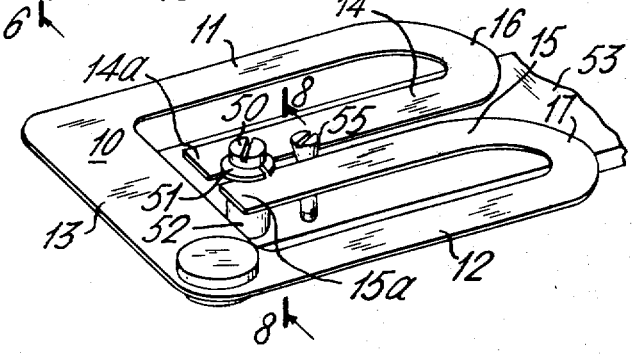
FIG. 7 is another embodiment having separate mounting and stressing members.
Figure 8:
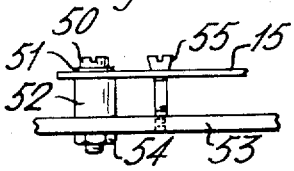
FIG. 8 is a cross-sectional view taken on line 8—8 of FIG. 7.

The embodiment of FIGS. 7 and 8 employ separate mounting and stressing screws. Mounting screw 50 passes through collar 52 and opening in base 53 to nut 54. Stressing screw 55, having a tapered head, is disposed between the end portions 14a, 15a of the inner arms, and is screwed into an opening in the base 53 to force these arms apart.

As noted previously, the particular position of the stationary contacts or the angle of mounting the inner legs can bias the blade to a normal curved condition in a selected direction to maintain movable contact 19 engaged with a selected stationary contact whenever no force is applied to the blade. If automatic return on release of actuating force is not desired, the contacts 20, 21 may be spaced on opposite sides of the plane of the blade 10, no normal curvature being established. In this case a vertical force in one direction at any of the points E, F, or G will cause the blade to snap to one curved condition, and a force in the opposite direction is required to reverse the curve of the blade.

The foregoing embodiments produce switches which can be actuated by extremely small forces, a 5-gram operating force can cause contacts to snap together and maintain contact pressure in the range of one and two grams, with movement differential on the order of .001 to .003 inch.

Figure 9:
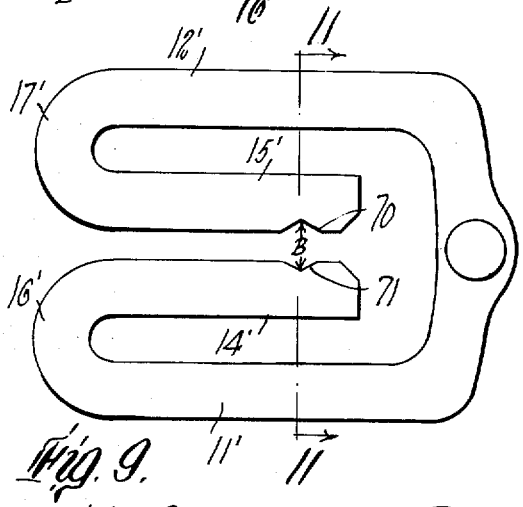
FIG. 9 is a plan view of another element in the unmounted and unstressed condition.

Referring to FIGS. 9 and 10, this M blade differs from that of FIG. 1 in that notches 70 and 71 are provided at the inner edges of the inner arms 14' and 15' near their free ends.

Figure 11:
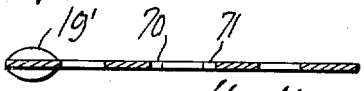
FIGS. 11 and 12 are cross-sectional views of the element of FIG. 10 before and after mounting and stressing, respectively.
Figure 12:
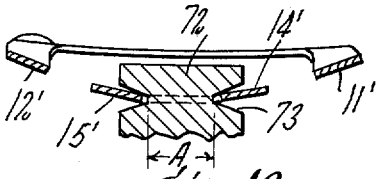

Referring to FIGS. 11 and 12, inner arms 14' and 15' can be permanently stressed apart by button 72 which has a peripheral groove 73 into which the notches 70 and 71 are snap fitted by a deflection of the arms, the diameter A of the bottom of the groove being substantially larger than the original spacing B of the notched inner arms causing stress to be applied to the loops 11', 16', 14' and 12', 17', 15'.

Figure 12A:
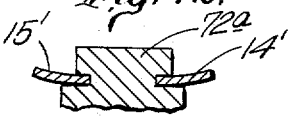
FIG. 12a is a cross-sectional view similar to FIG. 12 of another means of mounting the element.

The embodiment of FIG. 12a differs from FIG. 12 in that the peripheral groove 73' into which the arms fit is not V-shaped but rather has a rectangular cross-section only slightly exceeding the thickness of the arms; for instance if the arms have a thickness of .015 inch, the groove width can be .0155 or .0165 inch, providing a sliding fit. The confinement offered by the narrow groove prevents excessive warpage of the loops on actuation and aids the return of the blade. The walls defining the groove can differ in the degree of overhang as shown, or can have the same overhang.

Figure 12B:
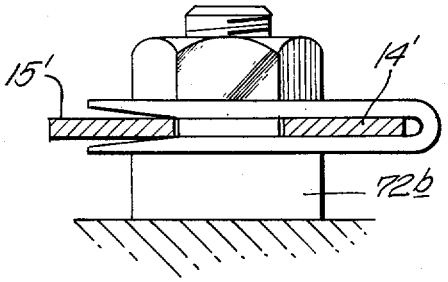
FIG. 12b is a cross-sectional view similar to FIG. 12 of another means of mounting the element.

In FIG. 12b is shown still another mounting device in which one inner arm 14' is rigidly mounted while the other is confined in a V slot. This mount does not require as accurate machining as FIG. 12a, but is as effective in some instances.

Referring to FIGS. 13, 14 and 15, the snap fitted button 72 comprises a stud that is permanently mounted on fixed base 74, and the contact 19' is disposed between top and bottom stops 75 and 76, either or both of which can serve as electrical contacts. As shown, the bottom contact 75 is positioned slightly above the plane of the blade so that in the normal position the contact 19' engages top contact 76. A further step 77 is positioned below loop 16' near its juncture with inner arm 14'. By applying an actuation force at point E downwardly, a turning moment is produced due to the reaction of stop 76, which ultimately forces the loop to over-center from concave to convex condition, snapping contact 19' down upon stop 75, the position shown in dotted lines, FIG. 16.

Referring to FIGS. 17, 18 and 19, the blade is mounted at point 84 in the center of connector bar 13'. The stressing button 72' is permanently secured to the inner edges of the inner arms 14', 15' and supports electrical contact 19''. The bridge actuator 85 engages the outer edges of the outer arms 11' and 12' cooperating with stops 87 and 88 disposed under the center of arcuate connections 16' and 17' to produce an actuating moment causing the inner legs to snap the contact 19'' between the stops 90 and 92.

The same bridge actuator arrangement can be employed when the stressing button mounts the blade.

In these embodiments using stops plus an actuating force to produce an actuating moment, the inner arms can be stressed over a substantial deflection, e.g., .060 inch, and extremely large contact pressures, e.g. 50 or 60 gm. can be obtained although there is some loss in the ratio of actuating force to contact pressure. The actuator travel differential and force differential remains very small, e.g. .001 inch travel differential and 15 percent force differential, and by changing the position of actuation, these values are easily adjustable. The stressing part of the inner arms 14' and 15' is not critical, in many instances a tolerance of ±.006 inch being allowable. With this construction currents as high as 25 amperes can be controlled with an inexpensive switch produced with normal manufacturing tolerances.

Referring to FIGS. 20, 21 and 22, the blade of FIG. 10 is mounted to produce contact pressures of as much as 40 grams in such a way that currents as high as 35 amperes can be controlled with a differential movement of the actuator as little as .0015 inch between the make and break positions. In this embodiment the stressing button is the one shown in FIGS. 12a or 12b. The button is permanently mounted as in FIG. 13, the electrical contact 19''' is mounted centrally on the connector bar 13' and a bridge actuator 98 is disposed over arcuate connections 16' and 17' of the two legs, engaging them centrally in line contacts 98' and 98'' as shown in FIG. 22. Stops 100 and 102 engage the inner edges of the inner arms, to produce the desired actuating moment.

Referring to FIG. 20, the blade and button assembly is mounted on a support 104 which is pivoted at 106. A micrometer adjustment knob 108 is adapted to move the support 104 about the pivot point. A heat sensitive device such as that employed for the oven of a domestic stove, comprising a bulb 110 containing a fluid adapted to expand with temperature rise, is connected through a bellows 112 to an actuator rod 114. The higher the temperature, the further the end of the actuator 114 is from bellows 112, with a change e.g. of .0004 inch per degree Fahrenheit. The adjustment knob 108 provides a very fine movement of the bridge 98 towards and away from end of the actuator rod, thus setting the temperature at which the blade is actuated. Because this switch has such a low differential travel for actuation, changes in less than 5°F. temperature can cause the blade to snap or return over a total selectable range of as much as 500°F.

Referring to FIGS. 23 and 25, the blade element 10a is mounted and stressed at its inner arms by a slotted pin 73 and a contact 19a is mounted centrally on the connector bar 13a. The pin 73 is mounted on the free end of a horizontal leaf spring 120 and an actuator yoke 122 engages the ends of the pin 73, the actuator being movable in a vertical plane P, against the force of spring 120. Two opposed camming contacts 21a and 22a are fixedly mounted adjacent the contact 19a.

When no force is applied to actuator 122, contact 19a presses against a part S of the camming surface 21a, parallel to plane P. The lower part L of this camming surface is slanted inwardly beyond the vertical plane P in which the inner arms of the blade move. When the actuator carries contact 19a down against the lower part L, the contact is forced to move through plane P, whereupon the blade 10a snaps through center to the opposite curved form. The slanted upper part U of camming surface 22a is positioned to be engaged by contact 19a when this occurs, before the element can fully achieve the reverse curved shape, so that contact 19a presses against camming surface 22a. The lowest part S' of camming surface 22a is parallel with plane P so that continued movement of the actuator 122 does not change the force conditions between contact 19a and camming surface 22a.

The upper part U of camming surface 22a slants inwardly across plane P. Therefore, when the force on actuator 122 is released and the leaf spring carries the blade 10a upwardly, a point is reached where the contact 19a is forced to move inwardly across plane P, whereupon the unstable blade snaps back to its initial form and the contact 19a engages the camming surface 21a. By appropriate connections 130, 132 and 134, the switch of FIGS. 23 through 25 can be caused to make and break circuits with up or down movement of the actuator.

It is important to note that the sliding surfaces S and S', that are parallel to the plane P of relative movement of the contact to the camming surfaces, enable constant contact pressure to be applied during over-travel and undertravel of the blade, while the slanted portions L and U apply the actuating force to snap the blade.

Obviously, many variations of the mounting of FIG. 23 as well as the particular shape of the element can be employed. For instance, with regard to mountings the element 10a could be made to turn about the pin 73 as center, or the pin 73 could be rigidly mounted while the camming surfaces 21a and 22a could be mounted to turn relative to the contact 19a.

It is true that the broad concept of wipe and shear actuation by camming surfaces acting on the contact is already known (see U.S. Pat. 2,899,512), but it was not until our discovery of the M-blade and its applicability to the concept has a practical, inexpensive wipe and shear switch been possible.

As has been suggested by the various embodiments, many different types of mounting and stressing various shapes of blades are possible. For instance, in one embodiment the inner edges of the inner arms can be forced apart by a slotted member which allows free twisting of the arms within limits, with such, it being preferred to use one or more reaction stop members spaced from the point of applying the actuating force; and in another instance it has been shown that the inner edges of the inner arms could be rigidly mounted. The first of these embodiments gives higher contact pressures, but requires higher actuating force and greater deflection of the blade than the other. Numerous factors influence the selection of the particular mounting to be employed for any particular switch, e.g. how much actuator over-travel must be permitted; how low must the actuating force be; and what ratio between actuating force and contact pressure is required. With such factors in mind various other mountings and actuating devices will suggest themselves for various applications.

In conclusion, it should be noted that the loops can be varied in size and shape, one can be made larger or otherwise different from the other and the location of one relative to another can be varied. The stress can be kept at a sufficiently low level that extremely long life is achieved. The low stress level enables over-traveling of the actuator without damage to the blade, while in the wipe and shear embodiment over-travel stress is completely avoided.

With the snap elements of this invention, the actuator for moving the electrical contact need move a smaller amount and have a smaller force differential and smaller total force than that required of prior art switches of the same capacity and expense. This represents an important advance in sensitivity of simply constructed switches, particularly since the element is applicable to switches for receiving very light actuating forces to handle small electrical currents, as well as to switches handling very heavy currents. The switches of the invention are readily adjustable, without criticality, over a wide range of operating conditions, and in many instances the tolerances for stressing the loops are greater than ±.005 inch which makes possible the use of very inexpensive machining and assembly operations.

What is claimed is:

1. A snap-acting mechanism comprising an essentially flat sheet of resilient material including a pair of loops having an outer pair of arms and an inner pair of arms, said loops disposed adjacent to one another with their open ends facing in the same general direction, the outer pair of arms of said pair of loops being secured against relative movement away from one another, and means for maintaining the inner pair of arms of said pair of loops in spaced apart relation at a distance greater than an unstressed condition for said sheet *and in a direction edgewise of the arms, transverse to the length thereof and lying in the general plane of the sheet,* thereby to stress said sheet and bias a portion thereof in a direction transverse to the plane of said sheet.

2. A snap-acting mechanism according to claim 1 further comprising means for maintaining at least portions of the inner edges of said inner pair of arms fixed relative to one another with respect to the plane of said sheet.

3. A snap-acting mechanism comprising an essentially flat sheet of resilient material including a pair of outer arms secured at adjacent end portions to one another [,] *by connecting means,* a pair of inner arms extending between said outer arms, *each having an inner end terminating closely adjacent to but separate from the connecting means,* [and] a pair of connecting portions each connecting one pair of adjacent end portions of one of said outer arms and one of said inner arms, and means for maintaining said pair of inner arms in spaced apart relation, *in a direction which is edgewise to and transverse to the length of the arms and lies in the plane of the sheet, said means connecting the inner arms close to their inner longitudinal edges and close to their inner ends,* thereby to stress said sheet and bias a portion thereof in a direction transverse to the plane of said sheet.

4. A snap-acting mechanism comprising a thin, essentially flat member of resilient material including a pair of outer arms, a connector extending between adjacent end portions of said outer arms, a pair of inner arms extending between said outer arms and having their free ends terminating within the space defined by said outer arms and said connector [,] *and lying closely adjacent to but separate from the connector,* [and] additional connections each extending between one of said outer arms and the corresponding one of said inner arms, and spacing means for maintaining portions of said free ends of said inner arms in spaced apart relation [.] *in a direction which is edgewise to the inner arms, transverse to the length thereof, and lies in the general plane of the member.*

5. A snap-acting mechanism according to claim 4 wherein said spacing means includes a generally U-shaped member secured to coextensive inner portions of said free ends of said inner arms and spreader means co-acting with the leg portions of said U-shaped member.

6. A snap-acting mechanism according to claim 5 wherein said spreader means includes a screw and wherein one of said legs of said U-shaped member has a threaded opening for cooperating with said screw so that the end of said screw can be driven into engagement with the other of said legs of said U-shaped member and thereby spread the legs thereof.

7. A snap-acting mechanism according to claim 4 further comprising an actuator positioned to engage one of said outer arms for displacing said one of said outer arms in a direction transverse to the plane of said flat member, thereby to alter the equilibrium condition of said flat member.

8. A snap-acting mechanism according to claim 4 wherein said spacing means includes a movable member having a tapered portion adapted to be driven into wedging engagement with adjacent edges of said portions of said free ends of said inner arms.

9. A snap-acting mechanism according to claim 4 wherein an electrical contact is secured to said flat member essentially at the junction of one of said outer arms and said connector.

10. A snap-acting mechanism comprising a snap blade formed of resilient sheet material having two loops that have outer and inner arms that are substantially parallel, *the inner arms terminating at inner ends that are separate and free,* a connector member extending between the [free] *outer* ends of the outer arms of said loops, and means for maintaining the inner and outer arms of each of said loops pressed [together,] *toward each other in a direction which is edgewise to the arms, transverse to the length thereof, and lies in the general plane of the member* to bias said loops [.] *into a snap-acting configuration.*

11. The snap-acting mechanism of claim 10 wherein said connector member is integral with said two loops.

12. The snap-acting mechanism of claim 10 wherein said means for maintaining the inner and outer arms of said loops pressed together comprises a single biasing member applying force between respective arms of said two loops, forcing each of said respective arms towards the other arm in the corresponding loop.

13. The snap-acting mechanism of claim 12 wherein said biasing member is incorporated in means to mount said snap blade.

14. The snap-acting mechanism of claim 10 wherein said two loops are disposed side by side, the mechanism is mounted substantially centrally by said inner arms, the connector member being free to move with snapping of said mechanism, and an electrical contact is carried adjacent the juncture of the connector member with one of said outer arms, the point of actuation of said mechanism being on the opposite side of said mounting substantially diametrically opposed from said electrical contact.

15. The element of claim 10 wherein the two loops are identical, and that the element is symmetrical with respect to location of the contact and location of actuating forces, each loop adapted to receive an actuating force.

16. The mechanism of claim 12 wherein the single biasing member comprises a member having slots in its opposite sides, portions of the inner arms of the loops being held in said slots.

17. The mechanism of claim 16 wherein said single biasing member is snap-fitted between the inner arms of said loops.

18. The mechanism of claim 16 wherein the connector member serves as the mount and the biasing member supports a movable electrical contact.

19. The mechanism of claim 10 wherein a bridge-type actuator is mounted to impose vertical forces upon intermediate portions of both of said loops simultaneously.

20. The mechanism of claim 19 wherein said blade is mounted at said inner arms, two support posts are disposed below the side of said element that is convex in the normal condition, each spaced from the point of mounting in the direction along the loop toward the connector member, and a bridge actuator means mounted to engage each of said loops at a location spaced from the respective support post in the direction along the loop toward the connector member.

21. The mechanism of claim 20 wherein said bridge actuator acts upon a transverse line across the middle of a semi-circular arcuate connection portion of each of said loops and said support posts are disposed near the inner edge of the corresponding inner arm.

22. The mechanism of claim 10 wherein the portions of said loops adapted to receive stress are mounted in a manner to limit movement relative to the general plane of the unstressed element.

* * * * *